United States Patent [19]

Kameyama et al.

[11] Patent Number: 4,941,005
[45] Date of Patent: Jul. 10, 1990

[54] PHOTOGRAPHIC CAMERA

[75] Inventors: Nobuyuki Kameyama, Tokyo; Takao Umetsu, Saitama; Tuyoshi Masaoka, Saitama; Haruo Onozuka, Saitama; Muneyoshi Sato, Saitama; Yukio Okazaki, Saitama, all of Japan

[73] Assignee: Fuji Photo Film Co., Ltd., Kanagawa, Japan

[21] Appl. No.: 366,182

[22] Filed: Jun. 14, 1989

[30] Foreign Application Priority Data

Jun. 14, 1988 [JP] Japan .................................. 63-146088
Jun. 14, 1988 [JP] Japan .................................. 63-146398
Oct. 11, 1988 [JP] Japan .................................. 63-255364

[51] Int. Cl.⁵ .......................... G03B 3/10; G03B 17/04
[52] U.S. Cl. .................................. 354/195.1; 354/288
[58] Field of Search ...................... 354/195.1, 288, 187

[56] References Cited

U.S. PATENT DOCUMENTS 4,597,657 7/1986 Wakabayashi ............... 354/195.1 X
4,806,961 2/1989 Kamitani et al. .................. 354/195.1
4,847,648 7/1989 Yamaguchi et al. ............ 354/288 X Primary Examiner—Michael L. Gellner
Attorney, Agent, or Firm—Young & Thompson

[57] ABSTRACT

A battery operated camera having a zoom lens in which film advance is controlled by counting pulse signals generated by film perforations and a first film frame is automatically placed in an exposure aperture when the film is loaded. The camera is set to an initial operation mode upon the battery being replaced. The initial operation mode is cleared in cooperation with shutter release when the camera is in the initial operation mode, so as to avoid an advance of several frames upon replacing the batter. A switch is provided in association with the lens barrier, and conditions of the switch are read upon replacing the battery so as to retract the zoom lens when a switch condition indicating that the lens barrier is closed is read or to extend the zoom lens when a switch condition indicating that the lens barrier is open is read. A data recording unit is provided and consists of liquid crystal segments for forming digits to be recorded, the liquid crystal segments being controlled to make all the segments visible for a predetermined time period upon loading of a new battery.

2 Claims, 15 Drawing Sheets

PHOTOGRAPHIC CAMERA

BACKGROUND OF THE INVENTION

The present invention relates to a photographic camera, and more particularly to a photographic camera with various features such as automatic film winding, zooming and automatic date recording.

In recent years, in photographic cameras, in particular compact cameras, it has become increasingly popular to have various automatic features, such as automatic exposure, automatic focusing, and automatic film winding and rewinding.

An automatic camera equipped with automatic film winding and rewinding features is adapted to place a first frame of a film in an exposure aperture of the camera upon closing a back door after loading the film in the camera. The film is wound up by one frame every exposure and, when all of the possible exposures of the film are made, the film is automatically rewound. This film rewinding is caused when a torque sensor detects a predetermined tension in the film.

To wind up the film by one frame every exposure, the camera is provided with a sprocket wheel in engagement with perforations of the film so as to be rotated by the advance of the film. The sprocket wheel produces pulse signals one for each perforation and, upon having produced a predetermined number of pulse signals, provides a stop signal ($S_o$) for stopping the motor.

Such an automatic film winding camera has various operation modes and is driven by means of battery power. Upon replacing a battery, the camera operation modes are cleared and reset to an initial operation mode.

An automatic camera equipped with a zoom lens is adapted to change the focal length of the zoom lens by means of a motor. That is, when turning on a long focal length selection switch or a short focal length selection switch, the motor is actuated to shift the zoom lens so as to have a long focal length or a short focal length. Upon turning off the switch to stop the zoom lens at a position wherein it has a desired focal length, an encoder detects the stopped position of the zoom lens to provide a signal indicating the given focal length. The signal is used as one of the data for a proper exposure. The zoom lens is covered and protected with a lens barrier when the camera is not used.

To shift the zoom lens so as to change its focal length, it is customary to use a motor. For light weight, a single motor is incorporated in the camera and used for winding and rewinding the film and shifting the zoom lens. For the same purpose, a battery or batteries are used not only to actuate the motor but also to charge an electronic flash and operate a microcomputer for controlling the camera.

The battery used in such a camera is heavily loaded and soon discharged. This requires the replacement of the battery during camera operation, often causing operation errors. That is, when replacing the battery while the camera is in an electronic flash charging mode, a film winding mode, or a focal length changing mode, the operation mode is cleared. For example, upon replacing the battery while the camera is in the film winding mode, the motor is powered on and the camera will carry out the first frame setting operation because the camera is set in the initial film setting mode due to the replacement of the battery and cannot determine that the film was loaded before the replacement of the battery. In the initial film setting mode, a film leader of the film is wound up by a length substantially equal to that of four frames. Accordingly, if the replacement of the battery takes place after several exposures of the film four frames of the film are wasted.

If a barrier switch is operated so as to close the lens barrier before replacing the battery, the lens barrier will close upon the replacement of battery. When the zoom lens is shifted forward, the lens barrier bumps the zoom lens and will be damaged.

OBJECTS OF THE INVENTION

It is, therefore, an object of the present invention to provide a battery powered automatic camera in which a first frame setting operation is disabled upon the replacement of a battery if a film has previously been loaded.

It is another object of the present invention to provide a battery powered automatic camera in which a lens barrier can be closed safely.

It is still another object of the present invention to provide a battery powered automatic camera in which a zoom lens is placed in a suitable position even when a battery is replaced.

SUMMARY OF THE INVENTION

The objects of the present invention are achieved by an automatic camera having a battery used commonly to advance a film and to shift a zoom lens so as to change the focal length thereof. The film advance is automatically controlled by counting pulse signals generated by means of perforations of the film and the first frame of the film is automatically placed in an exposure aperture of the camera upon loading the film.

According to a preferred embodiment of the present invention, camera operation control means is adapted to set the camera to an initial operation mode upon a battery being loaded into the camera, to detect a pulse signal for a predetermined time period after clearing the initial operation mode in cooperation with shutter releasing when the camera is in the initial operation mode, and to advance the film by one frame when the pulse signal is detected.

According to another preferred embodiment of the present invention, the camera is provided with a zoom lens as a taking lens which is moved back and forth by means of an electric motor so as to change the focal length thereof and a lens barrier which covers and protects the zoom lens when the camera is not used. The camera operation control means includes a switch adapted to open and close in cooperation with opening and closing of the lens barrier and is adapted to read conditions of the switch upon loading a battery in the camera so as to actuate the electric motor in order to shift the zoom lens inside a housing of the camera when reading a condition of the switch indicating that the lens barrier is closed or to shift the zoom lens to a photographic position when reading a condition of the switch indicating that the lens barrier is open.

According to still another preferred embodiment of the present invention, the camera has a data recording unit which comprises an erasable memory device for memorizing data to be recorded; a liquid crystal display device consisting of a plurality of liquid crystal segments for forming digits according to the data memorized in the erasable memory device. Data recording unit control means is adapted to detect a loading of a battery in the camera so as to drive all of the plurality of liquid crystal segments to make possible digits visible for a predetermined time period and to set the camera in an initial mode so as to set an off-display mode wherein no data are recorded at the end of the predetermined time period.

DETAILED DESCRIPTION OF THE INVENTION

Figure 1:
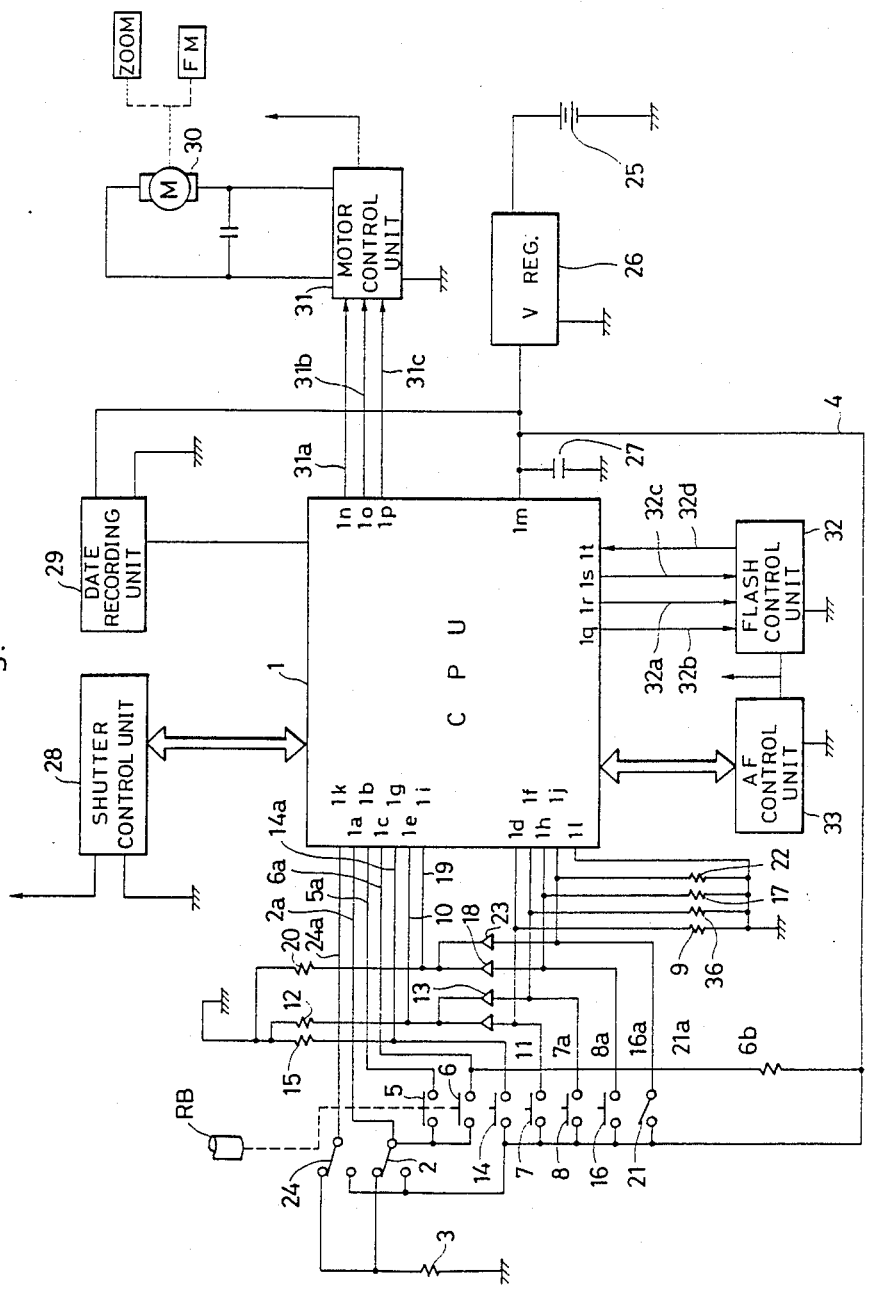
FIG. 1 is a block diagram showing a control system of a battery operated automatic photographic camera in accordance with a preferred embodiment of the present invention.

Referring to the drawings, in particular to FIG. I, a camera control circuit for controlling a camera in accordance with a preferred embodiment of the present invention is shown, comprising a microcomputer or central processing unit (CPU) 1 having a grounded port 1a. A main switch (SM) 2, which is turned on or off in cooperation with a lens barrier for protecting a taking lens, is connected to a port la of the camera control CPU 1 by way of a signal line 2a. The port 1a is grounded through a resistance 3 when the main switch (SM) 2 is turned off or connected to a power line 4 when turned off.

Upon depressing a shutter release button RB, a first release switch (SP1) 5 is closed first and then a second release switch (SP2) 6 is closed. The first release switch (SP1) 5 has a contact connected to a port 1b of the camera control CPU 1 by way of a first release signal line 5a and a contact connected to a movable contact of the main switch (SM) 2. Similarly, the second release switch (SP2) 6 has a contact connected to a port 1c of the camera control CPU 1 by way of a second release signal line 6a and a contact connected to the movable contact of the main switch (SM) 2. The second release signal line 6a is grounded through a resistance 6b.

The camera has a zoom lens as a taking lens whose focal length is varied by means of short focal length range (wide-angle photographic range) and long focal length range (telephotographic range) selecting switches 7 and 8, respectively. The short focal length selecting switch (which is hereinafter referred to simply as the wide switch) 7 has a contact connected to a port 1d of the camera control CPU 1 by way of a wide signal line 7a which is grounded through a resistance 9. A zoom signal line 10 branching off from the wide signal line 7a is, on the one hand, connected to a port le through a buffer gate 11 and, on the other hand, grounded through a resistance 12. The wide switch (SW) 7 has another contact connected to the power line 4.

The long focal length selecting switch (which is hereinafter referred to simply as the tele switch) 8 has a contact connected to a port 1f of the camera control CPU 1 by way of a tele signal line 8a which is, on the one hand, grounded through a resistance 36 and, on the other hand, connected to the zoom signal line 10 through a buffer gate 13. The tele switch (ST) 8 has another contact connected to the power line 4.

Upon turning on the wide or the tele switch 7 or 8 to select a photographic mode; a wide-angle photographic mode or a telephotographic mode, the zoom lens is automatically shifted so as to have a focal length suitable for the selected photographic mode. The shift of the zoom lens caused a neutral switch (SN) 14 to turn on for another selection of photographic mode. The neutral switch (SN) 14 has a contact connected to a port 1g of the camera control CPU 1 by way of a neutral signal line 14a grounded through a resistance 15 and another contact connected to the power line 4. When the neutral switch (SN) 14 is turned on, the port 1g is connected with the power line 4.

A self-timer exposing switch, which is turned on upon self-timer exposure, has a contact connected to a port 1h of the camera control CPU 1 by way of a self-timer signal line 16a which is grounded through a resistance 17 and another contact connected to the power line 4. The self-timer signal line 16a branching off therefrom is, on the one hand, connected to a port 1i of the camera control CPU 1 by way of a signal line 19 through a buffer gate 18 and, on the other hand, grounded through a resistance 20.

A rewind switch (SR) 21, which is incorporated with a film winding mechanism, is mechanically turned on to automatically start rewinding a film in the camera when all of the possible exposures of the film are made and the film has been fully wound up. As will be described in detail later, the rewind switch (SR) 21 is turned off in cooperation with opening a back door of the camera. The rewind switch (SR) 21 has a contact connected to a port 1j by way of a rewind signal line 21a which, on the one hand, branches off so as to be connected to the signal line 19 through a buffer gate 23 and, on the other hand, is grounded through a resistance 22.

A back door switch (SB) 24 is operated upon opening and closing the back cover of the camera. That is, the back door switch (SB) 24 is turned on when the back door is opened for loading or unloading a film and turned off when the back door is closed. The back door switch (SB) 24 is, on the one hand, connected to a port 1k of the camera control CPU 1 by way of a door signal line 24a and, on the other hand, connected to the power line 4 when it is turned on or grounded through the resistance 3 when it is turned off.

A power source or battery 25 is connected to a port 1m of the camera control CPU 1 through a regulator 26. The regulator 26 functions to apply a stable voltage to the camera control CPU 1. A noise killer capacitor 27 is connected to the camera control CPU 1 in parallel to the regulator 26. The power line 4 is connected to an output of the regulator 26 and supplies a stable voltage to the associated camera elements.

The camera control CPU 1 is connected with a shutter control unit (SC unit) 28, a date recording unit (DR unit) 29, a motor drive control unit (MDC unit) 31, a flash control unit (FC unit) 32 and an automatic focusing unit (AF unit) 33.

The date recording unit 29, which will be described in detail later, is actuated to record the current date on the film. The shutter control unit 28 effects shutter speed control and aperture control according to exposure conditions determined by means of a photometric device incorporated in the camera. Any type of photometric device well known in the camera art can be employed. The motor control unit 31 controls rotation of a motor 30 cooperating with a film winding and rewinding mechanism (not shown) of the camera. The motor control unit 31 is connected to film wind signal line 31a, zoom signal line 31b and stop signal line 31c which are connected to ports 1n, 1o and 1p of the camera control CPU 1, respectively. The motor control unit 31 causes the motor 30 to start rotation so as to wind up or rewind the film upon receiving a film wind signal from the port 1n or to shift the zoom lens for changing the focal length of the zoom lens upon receiving a zoom signal from the port 1o. When receiving a stop signal from the port 1p, the motor control unit 1 stops the motor 30.

The flash control unit 32 controls the charging and discharging of a main capacitor of an electronic flash unit (not shown) either incorporated in the camera or removably attached to the camera. The flash control unit 32 is connected to ports 1q, 1r, 1s and 1t of the camera control CPU 1 by way of a charge prohibiting signal line 32a, a charge start signal line 32b, a trigger signal line 32c and a charge completion signal line 32d, respectively. When receiving a signal from the port 1q, the flash control unit 32 prohibits or allows charging the main capacitor of the electronic flash unit. While the main capacitor is allowed to be charged, a signal from the port 1r causes the flash control unit to effectively continuously charge the main capacitor of the flash unit. Upon the main capacitor being fully charged, the flash control unit 32 provides a signal and sends it to the port 1t so as to terminate charging the main capacitor. In synchronism with opening the shutter as a result of depressing the shutter release button, a trigger signal is sent from the port 1s to the flash control unit 32 so as to discharge the main capacitor, thereby applying a trigger voltage to a discharge tube to emit a flash of light.

Upon depressing the shutter button half way, the first release switch (SP1) 5 is turned on so as to actuate the automatic focusing unit 33, thereby detecting the subject distance for adjusting the zoom lens to focus on the subject. As is well known in the art, the automatic focusing unit 33 has a subject distance sensor or circuit to provide the camera control CPU 1 with subject distance information so as to output a distance signal by which the zoom lens is focused on the subject.

The operation of the camera depicted in FIG. 1 is best understood by reviewing FIGS. 2 to 13, which are flow charts illustrating various routines for the camera control CPU 1. Programming a computer is skill well understood in the art. The following description is written to enable a programmer having ordinary skill in the art to prepare an appropriate program for the camera control CPU 1. The particular details of any such program would of course depend upon the architecture of the particular computer selection.

Figure 2:
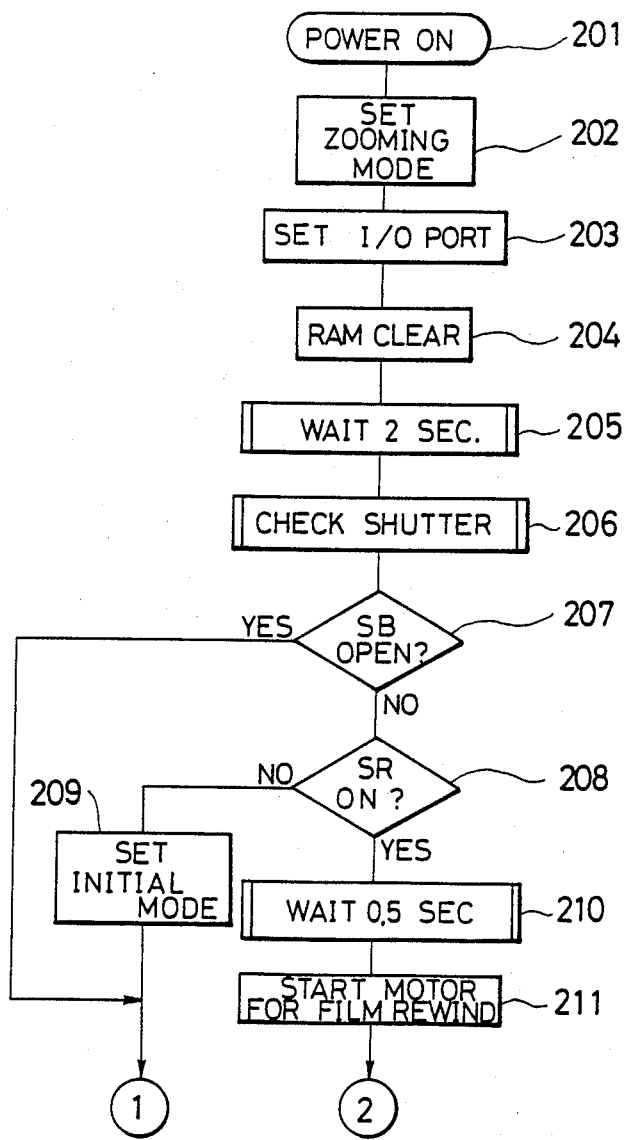
FIG. 2 is a flow chart illustrating an initial operation mode setting routine for a microcomputer of the control system shown in FIG. 1.

Referring now to FIG. 2, which is a flow chart of an initial operation mode setting sequence routine for the camera control CPU 1 when a power source is loaded in the camera, the first step 201 is to automatically power the camera control circuit shown in FIG. 1 upon the loading of the power source, such as batteries. Following to the powering of the camera control circuit, initial setting of the circuit is effected to set and store a zooming control mode for the zoom lens in a step 202, to set all of the input and output ports of the camera control CPU 1 in a step 203, and to clear a RAM in the camera control CPU 1 in step 204, in that order. After this initial setting, the lapse of a two-second time period is effected in a step 205. Then, the shutter is checked and returned to its starting condition if it is left open due to for example the discharge of the batteries in step 206.

The first decision in a step 207 is to read the condition of the back door switch (SB) 24 to determine whether the back door is open or closed. If the answer to the first decision is yes, this indicates that the back door is open for loading or unloading a film in the camera and therefore the back door switch (SB) 24 is turned on. In this case, because the camera is not ready for an exposure, an after-exposure operation routine shown in FIG. 3 is called for.

If the answer to the first decision is no, indicating that the back door is closed, the condition of the rewind switch (SR) 21 is read to determine whether the film is fully rewound or not, in a step 208. If the answer to the second decision is no, indicating that the rewind switch (SR) 21 is off, an initial mode is set and stored in the camera control CPU 1, in a step 209, because it is possible to make exposures and wind up the film if it has been loaded. Then, the routine goes to s step 301 for making the camera ready for exposures. If the answer to the second decision s yes, indicating that the battery 25 is fully discharged or used up during rewinding of the film, the motor drive control unit 31 receives a signal from the port 1n and causes the motor 30 to start rotating so as to transport the film in step 211, after the lapse of a 0.5-second time period in a step 210. Thereafter, the routine goes to a step 1001 of a film rewinding routine shown in FIG. 10 for rewinding the film.

Figure 3:
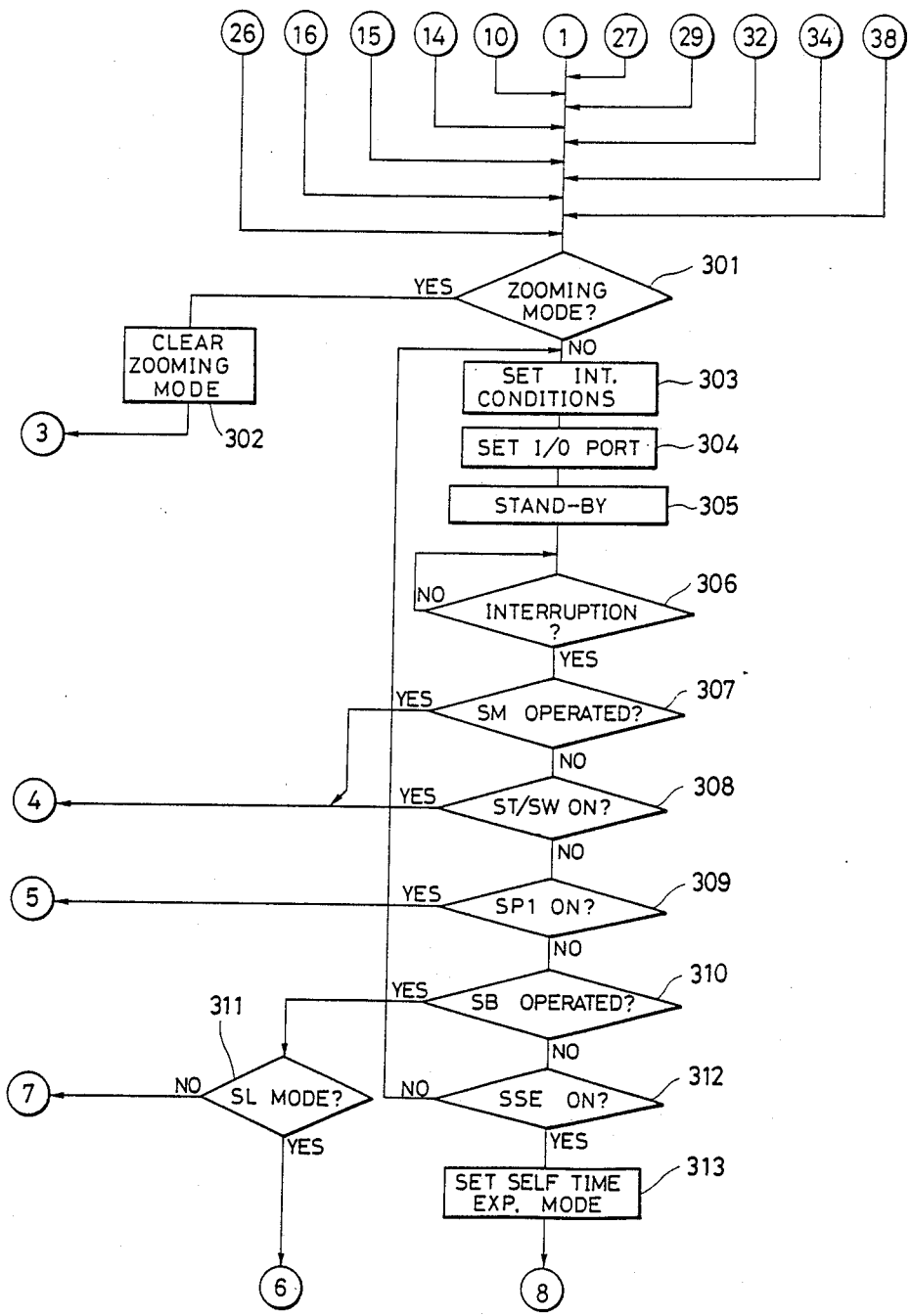
FIG. 3 is a flow chart illustrating an after-exposure operation routine for making the camera ready for exposure for a microcomputer of the control system shown in FIG. 1.

When the camera is ready for exposures, a decision is made in the first step 301 of the after-exposure operation routine shown in FIG. 3: "is the camera in the focal zooming control mode?" If the answer to the decision is yes, after clearing the zooming control mode in a step 302, the routine goes to a step 502 in FIG. 5 for focal length changing. If the answer is no, interrupt conditions are set in a step 303 so as to await the time when either one of the wide and tele switches 7 and 8 is operated and the input-output ports 1a to 1t of the camera control the CPU 1 in a step 304. In a step 305, the camera is brought to standby condition. Thereafter, a second decision in FIG. 3 is made in step 306: "should an interrupting operation be called for?". If the answer to the second decision is no, the routine goes back to the step 306 to make the same decision. This decision is repeated until a yes decision is made.

If the answer as to the interruption operation is yes, a third decision is made, and third to seventh decisions are made to determine the conditions of various switches in steps 307 to 312. That is, the third decision is made in the step 307 to determine whether the main switch (SM) 2 is closed as a result of the opening of the lens barrier. If the answer is yes, indicating that an exposure will be made or an exposure has just been made, the routine goes to a step 501 of a focal length changing routine shown in FIG. 5 in order to change the focal length of the zoom lens by shifting the zoom lens to a position wherein the zoom lens does not prevent the lens barrier from being closed. If the answer to the third decision in step 307 is no, indicating the main switch (SM) 2 is open, the fourth decision is made in the step 308 to determine whether the wide switch (SW) 7 or the tele switch (ST) 8 has been operated. If the answer to the fourth decision is yes, then the routine goes to a step 501 of the focal length changing routine shown in FIG. 5 in order to shift the focal length of the zoom lens.

If the answer is no, indicating that neither the wide switch 7 nor the tele switch (ST) 8 has been operated, then the condition of the first release switch SP1) 5 is read in the step 309 to determine whether the shutter release button RB is depressed. If the shutter release button is depressed halfway and closes the first release switch SP1) 5, and hence the answer is yes, indicating that an exposure is intended, the routine goes to a step 601 of a shutter operating routine shown in FIG. 6 so as to control the operation of the shutter.

If the answer is no, indicating that the first release switch (SP1) 5 is not turned on, the sixth decision is made in the step 310 to determine whether the back door is open or closed. If the answer to the sixth decision is yes, indicating the back door has been opened and then closed, the seventh decision is made in the step 311 to determine whether the shutter is locked or in a shutter lock mode (SL mode).

Figure 7:
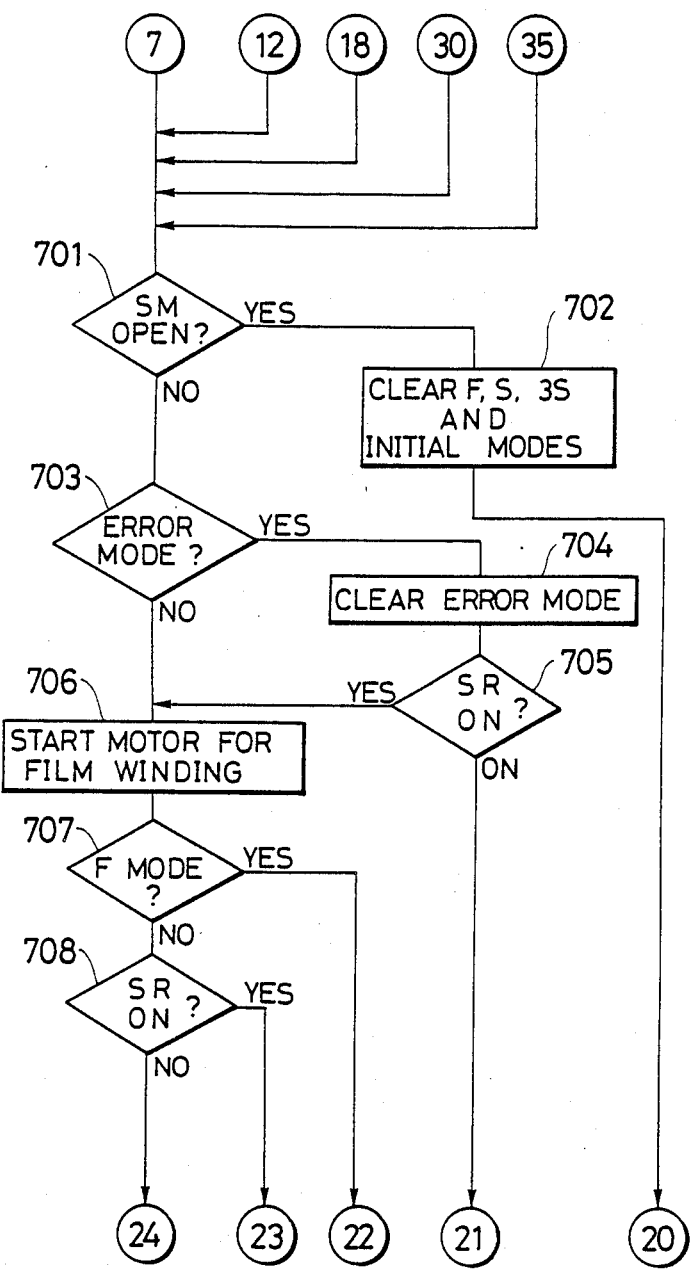
FIG. 7 is a flow chart illustrating an operation mode selecting routine for a microcomputer of the control system shown in FIG. 1.
Figure 13:
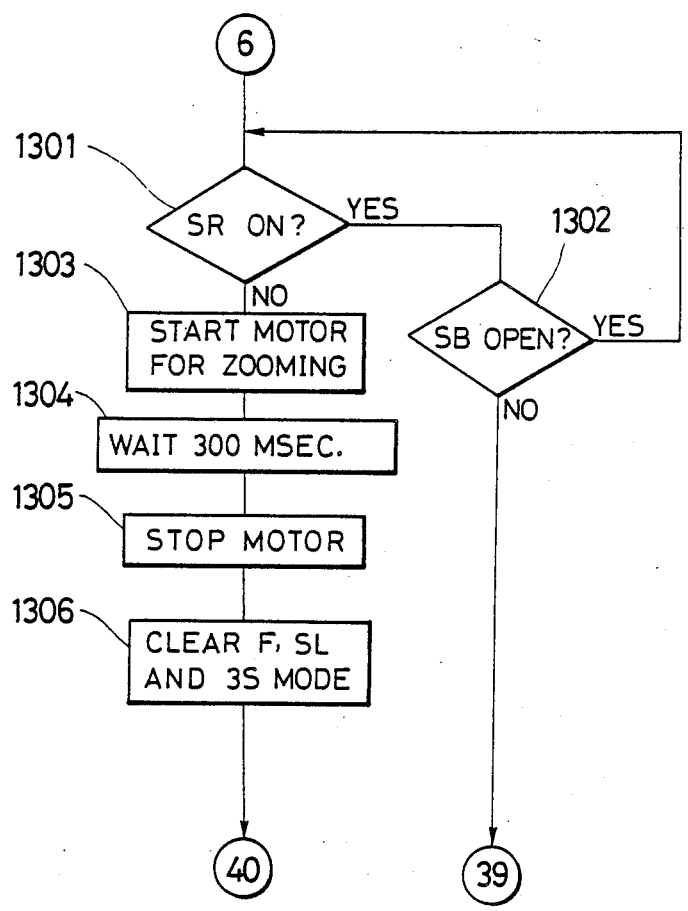
FIG. 13 is a flow chart illustrating a gear train changing routine for a microcomputer of the control system shown in FIG. 1.

The routine then goes to a step 1301 of a gear train changing routine shown in FIG. 13 if the answer to the decision regarding the shutter lock mode is yes, and otherwise to a step 701 of an operation mode selection routine shown in FIG. 7. If the answer to the sixth decision in the step 310 is no, indicating that neither opening nor closing of the back door has taken place, then the seventh decision is made: "is a self timer exposure switch (SSE) 16 closed or turned on?" If the self timer exposing switch (SSE) 16 is turned on, indicating that a self-timed exposure is intended, a self-timed exposure control mode is set and stored in the camera control CPU 1 in a step 313 and thereafter the routine goes to a step 401 of an electronic flash charging routine shown in FIG. 4 for charging the main capacitor of the electronic flash unit. As will be apparent from the above, when the camera is made ready for a self-timed exposure, charging the main capacitor of the electronic flash is started regardless of whether the main capacitor of the electronic flash has been charged or not. Otherwise, if the answer to the decision in the step 311 is no, the routine goes back to the step 303 so as to keep the camera ready for exposure.

Figure 4:
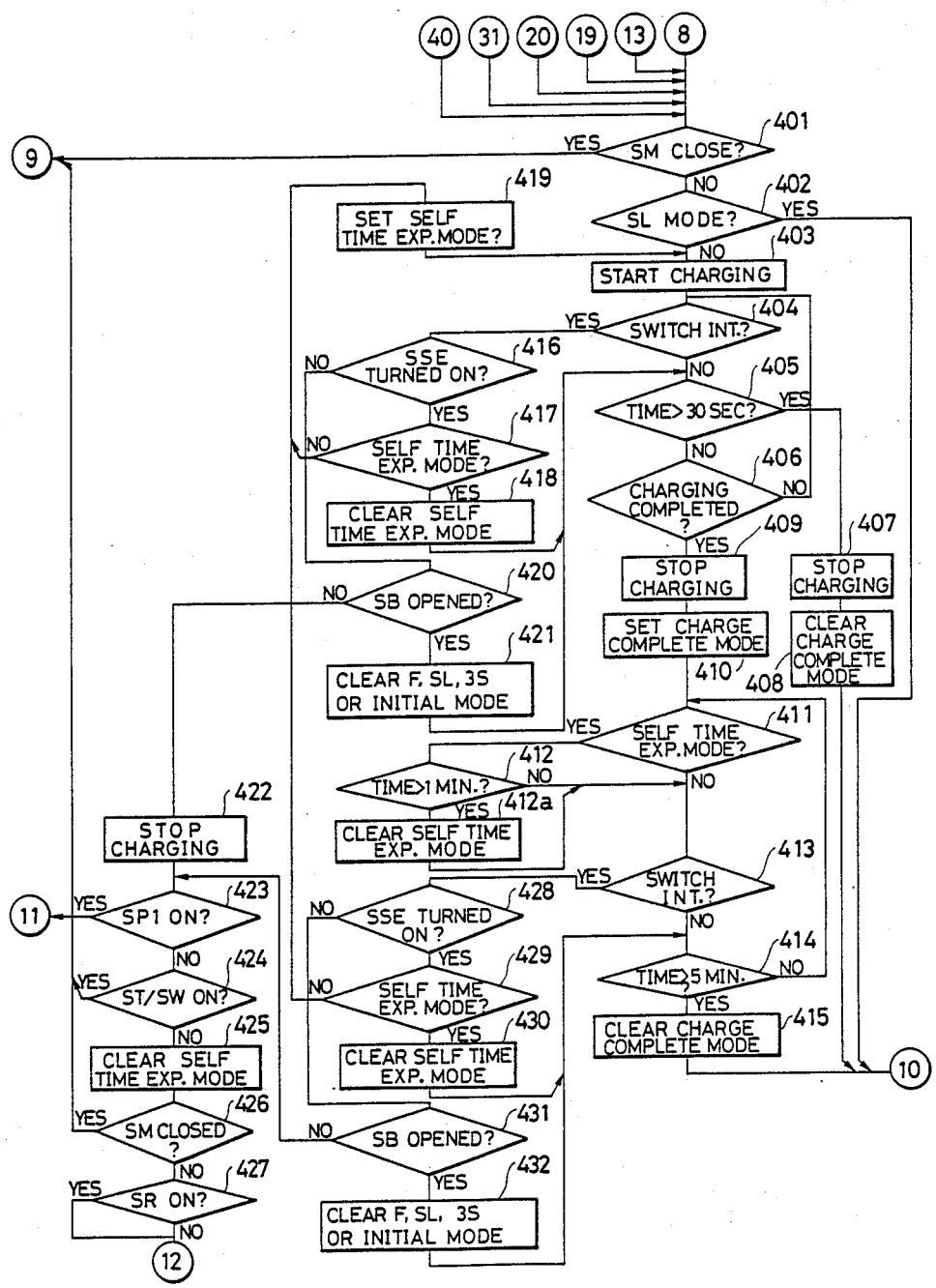
FIG. 4 is a flow chart illustrating an electronic flash charging routine for a microcomputer of the control system shown in FIG. 1.

Referring now to FIG. 4, which is a flow chart of the electronic flash charging routine, the first step 401 is to read the condition of the main switch (SM) 2 to decide whether the lens barrier is closed. If the answer is yes, indicating that the barrier is closed and no exposure is intended, charging of the main capacitor of the electronic flash unit is not needed and therefore the routine goes to the step 501 of the focal length changing routine shown in FIG. 5. If the answer to the decision is no, indicating that the barrier is open, a decision is made in a step 402: "has the shutter been looked or is it in the shutter look mode (SL mode)?" If the answer to the decision is yes, indicating that the shutter has been locked and thus disabled, charging the main capacitor of the electronic flash unit is not needed and then the routine returns to the step 301. Otherwise, charging the main capacitor of the electronic flash unit is started in a step 403.

After starting the charging of the main capacitor of the electronic flash unit, a decision is made in a step 404: "has one of the switches, namely the main switch (SM) 2, the first release switch (SP1) 5, the wide switch (SW) 7, the tele switch (ST) 8, the self-timed exposure switch (SSE) 16 or the rewind switch (SR) 21, operated?" If the answer to the decision is no, indicating that no switch has been operated, then another decision is made in a step 405: "has a 30-second time period elapsed?" If the 30-second time period has not elapsed, a decision is further made in a step 406: "has the main capacitor of the electronic flash unit been charged up?" If the answer is no, indicating that the main capacitor of the electronic flash unit has not been charged up, then the steps 404-406 are repeated until either the 30-second time period has elapsed or the main capacitor of the electronic flash unit has been charged up. If the 30-second time period has elapsed during the repetition of the steps 404-406, that is, the answer to the decision in the step 405 changes to yes, indicating a difficulty such as that the battery 25 is insufficient in voltage for the main capacitor of the electronic flash unit to charge up, the charging of the main capacitor of the electronic flash unit is interrupted in a step 406 and a charge complete mode is cleared in a step 408. The reason why the charge complete mode is cleared is that the main capacitor of the electronic flash unit has possibly been charged up in step 403 and the charge complete mode is set as will be described in detail later. Then, the routine returns to step 301.

If the answer to the decision in step 406 is yes, indicating that the main capacitor of the electronic flash unit has been charged up, the charging is stopped in a step 409 and the charge complete mode is set in a step 410; and thereafter, a decision is made in a step 411 whether the camera is set to the self-timed exposure mode or not. If the decision in step 411 is yes, another decision is made in a step 412: "has a one-second time period elapsed?" During the one-second time period, a photodiode is lighted to indicate the self-timed exposure mode. If the answer to the question is no, another decision is made in a step 413: "has any switch been interruptedly operated?" Otherwise, if the decision is yes, after clearing the self-timed exposure mode in a step 412a, said another decision is made in the step 413.

If the answer to the decision in step 413 is no, indicating that no interruption has taken place by operating any switch, a decision is made in a step 414: "has a five-minute time period elapsed?" If the answer is no, the decision in the step 411 is repeated. If the answer is yes, indicating the lapse of the five-minute time period, the charge complete mode is cleared in a step 415.

As will be apparent, the charge complete mode is held for five minutes after the charging up of the main capacitor of the electronic flash unit. After the lapse of the five-minute time period, the main capacitor of the electronic flash unit is subject to the risk of natural discharge. When the charge complete mode is cleared, the routine goes back to step 301 for an ordinary exposure.

If the answer to the question of step 404 is yes, this indicates that an interruption has taken place by operating any one of the switches while the main capacitor of the electronic flash unit is being charged, and a decision is made in a step 416: "is the self-timed exposure switch (SSE) 16 changed from off to on?" If the answer is yes, then another decision is made in a step 417 as to whether the camera is in the self-timed exposure mode or not. The reason why such a decision is made in step 417 is that whereas the self-timed exposure switch (SSE) 16 is turned off, the camera is kept in the self-timed exposure mode when the self-timed exposure switch (SSE) 16 was turned on in step 312 and the self-timed exposure mode has been stored in step 313. If the answer is yes, then the self-timed exposure mode is cleared in a step 518 and the charging of the main capacitor of the electronic flash unit is continued in step 405. That is, when the self-timed exposure switch (SSE) 16 is consecutively operated twice, the self-timed exposure is interrupted upon the second operation of the self-timed exposure switch (SSE) 16. If the answer to the question in step 417 is no, this indicates that whereas the self-timed exposure switch (SSE) 16 is operated, although the camera is not in the self-timed exposure mode, nevertheless, a self-timed exposure is intended. Then, after setting the camera to the self-timed exposure mode in a step 419, the routine goes back to step 403 to charge the main capacitor of the electronic flash unit.

If the answer to the question in step 416 is no, indicating that no operation of the self-timed exposure has been made, then a decision as to the opening of the back door is made in a step 420. If the answer is yes, after clearing the camera modes, such as the shutter lock (SL) mode, an auto focus (AF) mode and a 3S irregularity (3SI) mode which will be described in detail later, in a step 412, the routine goes back to step 405.

If the answer to the decision as to the back door opening is no, a decision is made to detect which one of the main switch (SM) 2, the first release switch (SP1) 5, the wide switch (SW) 7, the tele switch (ST) 8 and the rewind switch (SR) 21 other than the self-timed exposure switch (SSE) 16 has been operated. Because any one of these switches 2, 5, 7, 8 and 21 is operated to actuate the motor 30 or the automatic focusing unit 33, charging of the main capacitor of the electronic flash unit is interrupted in a step 422 due to the risk of low voltage of the battery 25 for the effective operation of the motor 30 or the automatic focusing unit 33.

Figure 5:
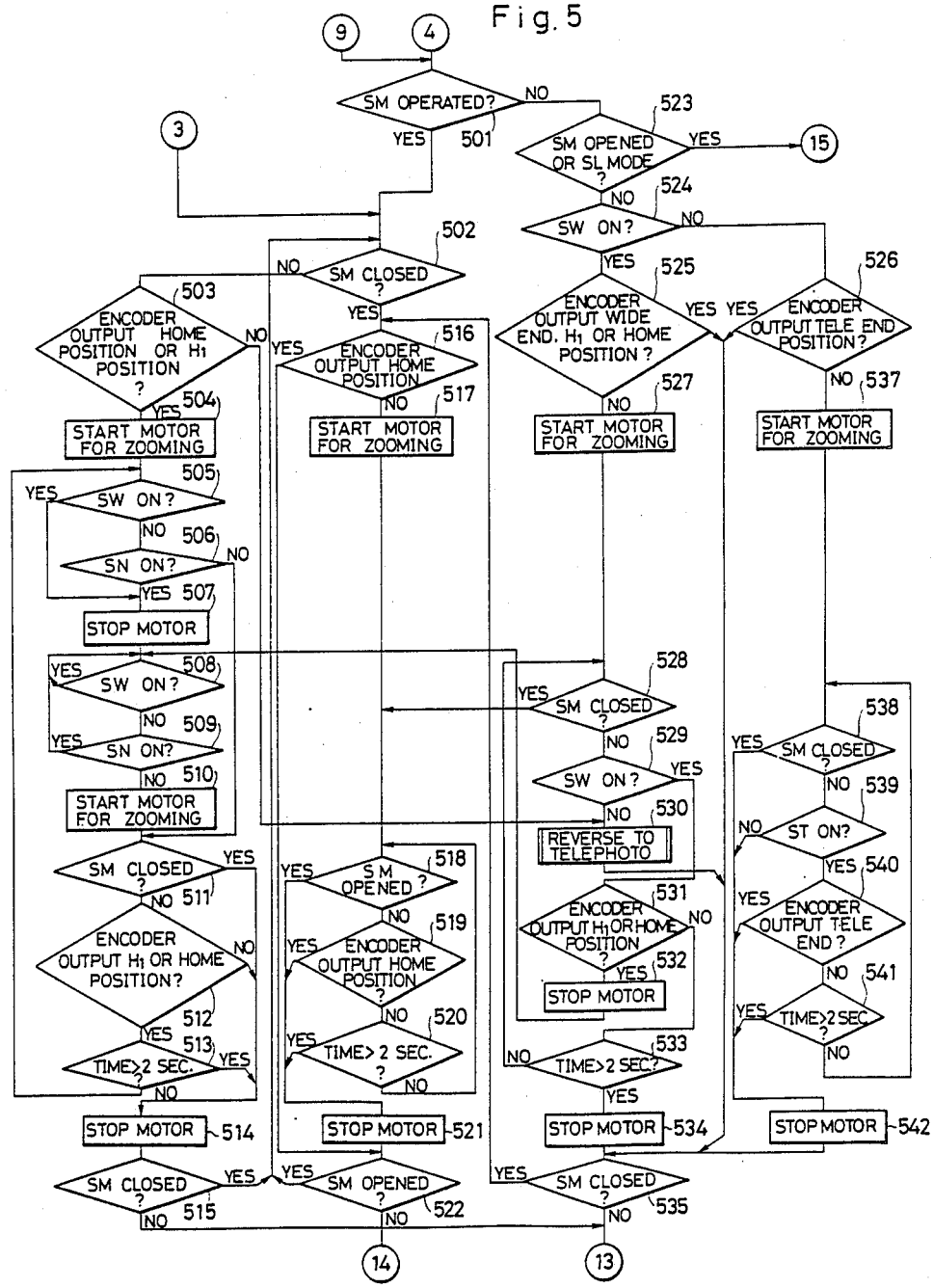
FIG. 5 is a flow chart illustrating a focal length changing routine for a microcomputer of the control system shown in FIG. 1.

After the interruption of charging, a decision is made in a step 423, whether the first release switch (SP1) 5 has been closed or not. If the answer is yes, the routine goes to a step 601 of a shutter operating routine shown in FIG. 6 for effecting an exposure. Otherwise, if the answer to the question in step 423 is no, another decision is made in a step 424: "has the wide switch (SW) 7 or the tele switch (ST) 8 been operated?" If the answer is yes, indicating that either one of the wide and tele switches 7 and 8 has been operated, then step 501 of the focal length changing routine shown in FIG. 5 is called for. If the answer to the question in step 424 is no, this indicates either that the main switch (SM) 2 has been operated responsive to the closing of the back door or that the rewind switch (SR) 21 has been operated. Therefore, no exposure was ever intended and the self-timed exposure mode is cancelled in a step 425.

In a step 426, a decision is made whether the main switch (SM) 2 has been operated or not. If the main switch (SM) 21 has been operated, that is, the answer to the question is yes, step 501 of the focal length changing routine (FIG. 5) is called for to shift the zoom lens to a position wherein the zoom lens permits the lens barrier to be closed without interference. If the answer is no, then another decision is made whether the rewind switch (SR) 21 has been operated or not. Regardless of the answer to the question, the operation mode selection routine shown in FIG. 7 is called for.

If the answer to the question in step 404 indicating that any one of the switches, namely the main switch (SM) 2, the first release switch (SP1) 5, the wide switch (SW) 7, the tele switch (ST) 8, the self-timed exposure switch (SSE) 16 and the rewind switch (SR) 21, has not been operated during charging, the charge complete mode is retained for five minutes after the completion of charging (step 414). If any one of the switches 2, 5, 7, 8, 16 and 21 is operated in that five-minute time period, the answer to the question in step 413 is yes, and then another decision is made: "has the self-timed exposure switch (SSE) 16 been operated?" If in fact the self-timed exposure switch (SSE) 16 has been operated, a decision is made in a step 429: "has the self-timed exposure mode been set?" If the answer to this question is yes, the step is repeated to count the five-minute time period after clearing the self-timed exposure mode in a step 430. Otherwise, if the answer in step 429 is no, after setting the self-timed exposure mode in step 419, charging the main capacitor of the electronic flash unit is started in step 403. In this case, because the main capacitor has been charged up, the time required to recharge the main capacitor is quite short. If the answer to the question in step 428 is no, a decision is made in the step 431, "is the back door open?" If the back door is open, after clearing the F mode, SL mode, 3S error mode and initial mode, step 414 is repeated. If the back door is not open, the question is repeated in step 423. If the answer to the first question in FIG. 4 is yes, the focal length changing routine shown in FIG. 5 is called for.

When the answer to questions 307, 308, 401 or 426 is yes, a decision is made in a step 501: "is the main switch (SM) 2 operated, or turned on or off?" If the answer is yes, another decision is made in a step 502: "is the barrier open or closed?" If the barrier is open, this indicates that an exposure is intended, then the zoom lens has to be located at a position suitable for taking a picture. Otherwise, if the barrier is closed, this indicates that an exposure has been made, then the zoom lens has to be moved back inside the camera housing. That is, if the answer to the question as to the condition of the main switch (SM) 2 does not indicate that the barrier is open, then the routine goes to step 503.

As was described above, because the zoom control mode has been set just after loading the battery in the camera, the decision in step 502 is also made after clearing the zoom control mode in step 302.

In step 503, a decision is made: "does the encoder output indicate a home position or a position $H_1$?" It is to be noted that the zoom lens can be shiftable among the home position, a wide end position and a tele end position. At the home position, the zoom lens is retracted in the camera housing beyond the wide end position so as not to interrupt the barrier. The zoom lens is shifted between the wide end and the tele end position to change the focal length thereof. At the $H_1$ position, the zoom lens is located between the home position and the wide end position. If the answer to the question as to the position of the zoom lens is no, the routine goes to a step 530 which will be described in detail later. But if the answer to the question in step 503 is yes, this indicates that the zoom lens is located at a position unsuitable for taking a picture although the barrier is open. Then step 504 is taken to start the motor 30 for shifting forward the zoom lens by means of a signal provided from the port 1o of the camera control CPU 1. Thereafter, a decision is made in a step 505: "is the wide switch (SW) 7 turned on?" This decision is made so as to check the condition of a gear train for transmitting the motor output to the zoom lens. This decision is essential in case the motor 30 can rotate in one direction only and a reversible gear train cooperates with the motor 30 so as to move back and forth. That is, when the wide switch (SW) 7 is on, the reversible gear train transmits the motor output so as to move the zoom lens backward. If the answer to the question as to the condition of the wide switch (SW) 7 is yes, the motor 30 is stopped in a step 507 so as not to move back further the zoom lens. When a neutral switch (SN) 14 is on, even though the wide switch (SW) 7 is off, this indicates that the reversible gear train transmits the motor output so as still to move back the zoom lens. Therefore, the condition of the neutral switch (SN) 14 is read in a step 506. If the answer to the decision is yes, the motor 30 is stopped in a step 507.

After stopping the motor 30, the conditions of the wide switch (SW) 7 and the neutral switch (SN) 14 are read again in steps 508 and 509, respectively. If the answer to any one of the questions in steps 508 and 509 is yes, the decision is taken only when both of the answers to the questions in steps 508 and 509 are no, indicating that both of the switches 7 and 14 are off. In a step 510, the motor 30 is driven for shifting the zoom lens. On the other hand, if the answers to the decisions in steps 505 and 506 are no, indicating that both of the switches 7 and 14 are not on, a step 511 is taken while the motor 30 is continuously driven.

In step 511, the condition of the main switch (SM) 2 is read to determine whether the barrier has been closed. If the answer is no, indicating that the barrier is open, the output of the encoder is read in a step 512 to determine whether the zoom lens is at the $H_1$ position or the home position. If the zoom lens is at either one of the $H_1$ and home positions, a decision is made in a step 513 while the motor 30 is kept in rotation: "has a two second time period elapsed?" Before the lapse of the two second time period, the routine goes back to step 505.

If the answer to the question in step 511 is yes, indicating that the main switch (SM) 2 is closed, which in turn indicates that the barrier is closed and no exposure is intended, then the motor 30 is stopped in a step 514. If the answer to the question in step 512 is no, indicating that the zoom lens is out of the $H_1$ or home position or has moved forward, the motor is stopped in step 514. If the answer to the question in step 513 is yes, this indicates that the encoder continues to provide an output indicating that the zoom lens is at the $H_1$ or home position and that the zoom lens is considered to be in jeopardy, then after stopping the motor 30 in step 514, the condition of the main switch (SM) 2 is read in a step 515. If the main switch (SM) is open, indicating that the barrier is open, step 401 of the electronic flash charging routine is taken to charge the main capacitor of the electronic flash unit. Otherwise, if the main switch (SM) 2 is closed, indicating that the barrier is closed, step 502 is taken to retract the zoom lens into the camera housing.

When the barrier is closed, a step 516 is taken to decide whether the zoom lens is at the home position, by reading the output of the encoder. If the answer to the question in step 516 is no, the motor 30 is driven in a step 517 so as to retract or move backwardly the zoom lens. Because the wide switch (SW) 7 is designed to turn on in cooperation with the operation of the main switch (SM) 2 upon closing the barrier, it is not necessary to check the conditions of the wide switch (SW) 7 and the neutral switch (SN) 14 in steps 505 and 506 before starting the motor 30. Thereafter, a decision is made in a step 518 while leaving the motor 30 in rotation: "is the main switch (SM) 2 kept in a condition where the barrier is open?" If the answer to the question in step 518 is no, indicating that the barrier is closed, the encoder output is read to decide whether it indicates the home position in a step 519. If the answer to the question is no, the lapse of a two second time period is checked in a step 520. If the two-second time period is not elapsed, the steps 518 to 520 are repeated. If the two-second time period has elapsed, the motor 30 is stopped in a step 521 because the barrier is open. If the answer to the question in step 519 is yes, indicating that the encoder output indicates the home position, a step 521 is taken directly to stop the motor 30. If the answer to the decision in step 520 is yes, this indicates that the encoder output does not indicate the home position although the two-second time period has elapsed and therefore a difficulty has arisen, then the motor is stopped in step 521.

After stopping the motor 30 in step 521, a decision is made in a step 522: "is the barrier opened without the main switch (SM) 2 being left open?" If the answer to the question is yes, the steps 502 and 503 are taken again to move the zoom lens to a position suitable for taking a picture. Otherwise, if the answer to the decision in step 522 is no, indicating that the barrier is closed, then the routine goes back to step 301 for maintaining the camera ready for exposure.

If the answer to the question as to the operation of the main switch (SM) 2 is no, a decision is made in a step 523: "has the main switch (SM) 2 been opened?" or "has the shutter lock mode been set?" If the answer to the decision is yes indicating that the barrier is closed or the shutter is locked, so as not to allow any exposure, then it is not necessary to move the zoom lens. The routine goes back to step 301 for maintaining the camera ready for exposure. If the answer to the decision in step 523 is no indicating that the barrier is open and the shutter is not locked, then a decision is made in a step 524: "is the wide switch (SW) 7 on?" This condition occurs when the operator views an object through a finder for framing.

If the answer to the question in step 524 is yes, indicating that the zoom lens has to be positioned for focusing, then a decision is made in a step 525 whether the encoder output indicates the width end position, the $H_1$ position or the home position. As the operator may operate the tele switch (ST) 8 without operating the wide switch (SW) 7, the answer to the question in step 524 is yes and so a step 526 is taken.

If the answer to the decision in step 525 does not indicate the zoom lens has been moved forwardly, a decision is made in a step 528 whether the main switch (SM) 2 is closed in a step 528 after driving the motor 30 for zooming in a step 527. If the barrier is open, and the answer to the question is no, then a step 529 is taken to decide whether the wide switch (SW) 7 is on. If the answer to the question is yes, a step 531 is taken to read the encoder output so as to decide whether the zoom lens is at the $H_1$ position or the home position. If the zoom lens is at neither the $H_1$ position nor the home position, a decision is made in a step 533: "has a two second time period elapsed?" If the two second time period has not elapsed, the routine goes back to step 528 to repeat the decision so as to read the condition of the main switch (SM) 2.

If the answer to the decision in step 528 does not indicate that the main switch (SM) 2 is operated in cooperation with closing the barrier, step 518 is taken while the motor 30 is kept in rotation so as to retract the zoom lens inside the camera housing.

If the answer to the question whether the wide switch (SW) 7 is on in the step 529 is no, indicating that the wide switch (SW) 7 has been released, then a step 530 is taken so as to stop the motor 30 after moving the motor 30 slightly forward. This slight forward movement of the zoom lens is made in order to remove play due to the backlash of the reversible gear train caused when changing the direction of movement of the zoom lens.

If the answer to the question as to lens position in step 531 is yes, indicating that the zoom lens is at either the $H_1$ position or the home position, then, after stopping the motor 30 in a step 532, steps 508 to 512 are repeated so as continuously to drive the motor 30 until the encoder removes an output indicating the $H_1$ position or the home position. In these steps, because the zoom lens is moved in the same direction, it is not necessary to remove the play due to the backlash of the reversible gear train.

When the wide switch (SW) 7 is on and the zoom lens is detected to be at any one of the wide end positions, the $H_1$ position and the home position, or when step 530 has been taken, a decision is made in a step 535 whether the main switch (SM) 2 is closed. If the answer is yes, then the routine goes back to step 516 so as continuously to drive the motor 30 in step 517 until the encoder output indicates the home position in step 519. On the other hand, if the answer to the question in step 535 is no, step 401 is taken for charging the main capacitor of the electronic flash unit. If the answer to the question in step 533 is no, which indicates that the encoder output does indicate either the $H_1$ position or the home position, then the motor 30 is stopped in step 534 because of possible trouble.

If the answer to the question in step 524 is no, this indicates that the tele switch (ST) 8 has been operated so as to view and frame a subject through the finder. In this case, step 526 is taken to decide whether the encoder output indicates the wide end position. If the answer is yes, step 535 is taken without driving the motor 30.

If the answer to the question in step 626 is no, then after driving the motor 30 to move the zoom lens forward for zooming in a step 537, decisions are made in steps 538 to 541. That is, the condition of the main switch (SM) 2 is read to decide whether the main switch (SM) 2 has been operated so as to close the barrier in step 538. If the answer to the question is no, then the condition of the tele switch (ST) 8 is kept on in step 539. If the answer to the question is yes, indicating that the tele switch (ST) 8 is on, then a decision is made in step 540 whether the encoder output indicates the tele end position. If the answer is no, steps 538 to 540 are repeated until the answer to a question whether a two-second time period has elapsed is made in step 541.

If the answer is yes in any one of steps 538 to 541, the motor 30 is stopped in a step 542 and then the routine goes back to the step 535. A yes answer in step 538 indicates that the barrier is closed and it is not necessary to move the zoom lens forward. In this case, the answer to the question in step 535 is yes, and the routine goes back to step 516 for moving back the zoom lens to the home position. A no answer in step 539 indicates that the tele switch (ST) 8 is off, and so the motor 30 is stopped. A yes decision in step 540 indicates that the zoom lens is at the telephoto end position and no movement of the zoom lens is effected. A yes decision in step 541 indicates that the zoom lens cannot reach the telephoto position after the lapse of the two-second time period, and this is considered to be a trouble condition. If the answer to the question in step 535 is no, indicating that the barrier is open, then step 401 is taken to charge the main capacitor of the electronic flash so as to ready the camera for exposure.

Figure 6:
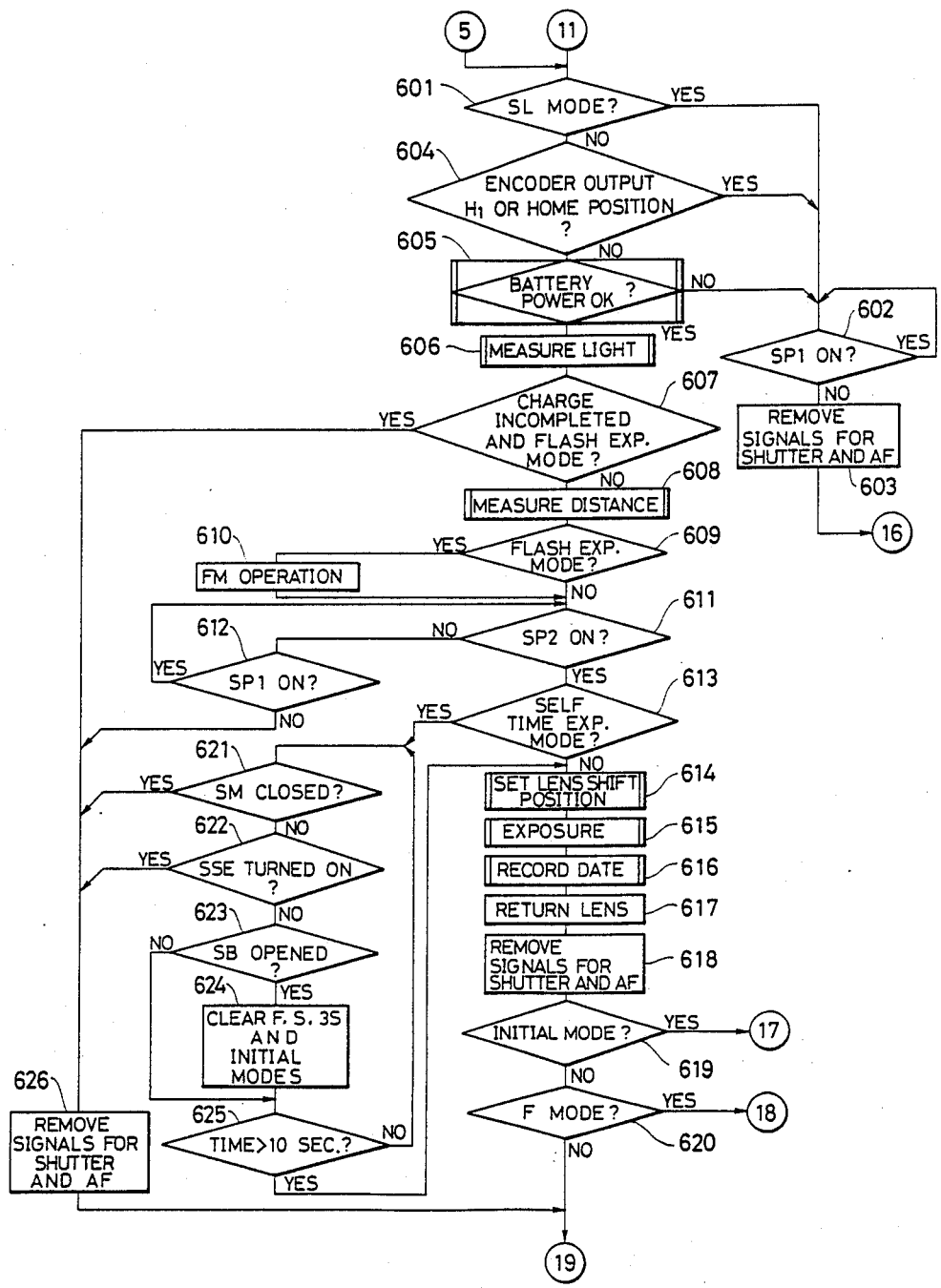
FIG. 6 is a flow chart illustrating a shutter operating routine for a microcomputer of the control system shown in FIG. 1.

Referring now to FIG. 6, which is a flow chart illustrating the shutter operating routine, the first decision in FIG. 6 is made when the camera is ready for exposure or when the shutter release button RB is depressed and the first release switch (SP1) 5 is closed thereby in step 309 or 423 during charging of the main capacitor of the electronic flash unit.

The question in step 601 is asked, "is the shutter lock (SL) mode set?" If the answer is yes, indicating that the shutter release button RB cannot be operated, then a step 602 is taken. If the answer is no, indicating that the shutter release button is operable, then a decision is made in a step 604 to read the encoder output. If the encoder output indicates the $H_1$ position or the home position, that is, when the answer to the question in step 604 is yes, this indicates that the zoom lens is at a position unsuitable for taking a picture. At this time, because the shutter release button should not be operated, the routine goes to step 602. If the answer to the question in step 604 is no, a step 605 is taken to check the battery 25 so as to decide whether the battery has sufficient power to perform a measurement of subject distance and an operation of the shutter mechanism. If the battery has insufficient power, then step 602 is taken.

In step 602, a question is asked "has the first release switch (SP1) been turned on?" This question is repeated until the answer to it becomes no. When the first release switch (SP1) is turned off as a result of removing a finger of the operator from the shutter release button and the answer to the question in step 602 correspondingly becomes no, after having removed signals for controlling the shutter control unit 28 and the automatic focusing unit 33 in a step 603, the routine goes back to step 301 for making the camera ready for exposure.

If the answer to the question in step 605 is yes, a measurement of brightness of the subject is carried out in a step 606 to store data of the measured subject brightness which is used to make a proper exposure. Thereafter, a decision is made in a step 607, based on the stored data, as to whether the main capacitor has been charged up and a flash exposure can be made. If the answer is no, this indicates that charging is complete and that an exposure can be made; then a measurement of subject distance is carried out in a step 608 to store data of the measured subject distance. Thereafter, a decision is made in a step 609: "should a flash exposure be made?" If a flash exposure should be made, a step 610 is taken to calculate a proper flashmatic exposure based on the data of the measured subject distance so as to determine an aperture size of the shutter and then a step 611 is taken. On the other hand, if the answer to the question in step 609 is no, indicating that no flash exposure is required, then step 611 is taken without taking step 610.

In step 611, a decision is made: "has the second release switch (SP2) 6 been closed or turned on?" If the answer is no, a decision is made in a step 612 to decide whether the first release switch (SP1) 5 is on. When the first release switch (SP1) 5 is on, step 611 is repeated until the answer to the question in step 612 becomes no, indicating that the first release switch (SP1) 5 is open. On the other hand, if the answer to the question in step 611 is yes, this indicates that the shutter release button has been fully depressed with an intention of making an exposure, and so then a step 613 is taken to decide whether the self-timed exposure mode has been set. If the answer to this last question is no, indicating that no self-timed exposure mode has been set, an exposure is performed. That is, the zoom lens is set to a position determined based on the data of the subject distance in a step 614 and then an exposure is made in a step 615. After this exposure, the zoom lens is moved back to the initial position in a step 617 after recording the date of exposure on a film if required in a step 616, thereby completing the exposure. Thereafter, signals for controlling the shutter mechanism and the AF control unit are removed and the charge complete mode is cleared if a flash exposure has been made.

In a step 619, a decision is made as to whether the initial mode has been set. If the answer to the question is yes, the routine goes to a step 1101 of a battery replacing routine shown in FIG. 11. On the other hand, if the answer is no, a decision is made in a step 620 to decide whether an F mode is set. If the F mode is set, the routine goes to step 701 to perform the operation mode selection routine. Otherwise, if the answer to the question is no, indicating that the F mode is not set, the routine goes back to the step 410 to charge the main capacitor of the electronic flash unit.

If the answer to the question as to the self-timed exposure mode in step 613 is yes, a step 621 is taken. In step 621, a decision is made whether the main switch (SM) 2 has closed as a result of the closing of the barrier. If the answer is no, another decision is made in a step 622 as to whether the self-timed exposure switch (SSE) 16 is closed or on. If the answer in step 622 is no, a decision is made in step 623 to read the condition of the back door switch (SB) 24 so as to decide whether the back door is opened. If the answer to the question in step 623 is no, a decision is made in a step 625: "has a ten-second time period elapsed after the closing of the second release switch (SP2)?" Otherwise, if the answer to the question in step 623 is yes, indicating that the back door is open, after clearing the F mode, SL mode, 3S error mode and initial mode, the decision in step 625 is made.

If the answer to the question in step 607 is yes, this indicates that, although a flash is needed, the main capacitor of the electronic flash unit has not been charged up, so that a proper flash exposure cannot be made. Then, signals for controlling the shutter mechanism and the AF unit are removed in a step 626. On the other hand, if the answer to the question in step 612 is no, this indicates that a finger of the operator has been removed from the shutter release button with an intention of interrupting the exposure; then step 626 is taken to remove signals for controlling the shutter mechanism and the AF unit. Furthermore, if a yes decision is made in step 621, indicating that the barrier is closed or in step 622, indicating that the self-timed exposure switch (SSE) 16 is closed in the self-timed exposure mode so as to cancel the self-timed exposure mode, then step 626 is taken to remove signals for controlling the shutter mechanism and the AF unit and thereafter step 410 is taken to charge the main capacitor of the electronic flash unit.

Referring now to FIG. 7, which is a flow chart illustrating the operation mode selection routine when a no decision is made, indicating that the shutter lock (SL) mode is not set in step 311, when the decision as to the rewind switch (SR) 21 is made in step 427, or when a yes decision is made indicating that the F mode is set in step 620, the first step in FIG. 7 is to read the condition of the main switch (SM) 2 so as to decide whether the back door is open. If the answer is yes, indicating that the back door is open and no exposure is intended, then, after clearing the F, SL, 3S error and initial modes, the routine goes back to step 401 to charge the main capacitor of the electronic flash unit.

If the answer to the question as to the main switch (SM) 2 is no, a step 703 is taken to decide whether the back door error mode which will be described later is set. If the answer to the question is yes, then, after clearing the back door error mode in a step 704, a step 705 is taken to make a decision: "is the rewind switch (SR) 21 on?" If the answer to the question as to the rewind switch (SR) 21 is no, then the routine goes to a step 1201 to perform a procedure of correction of an error of operation of the back door. On the other hand, if the answer to the question in step 705 is yes, indicating that the rewind switch (SR) 21 is on, then a step 706 is taken to drive the motor 30 for film winding. Step 706 is taken also if the answer to the question in step 703 is no. Thereafter, a decision is made in a step 707 as to whether the F mode is set. If the answer to the question is yes, the routine goes to a step 901 of a one-frame film winding routine.

Figure 10:
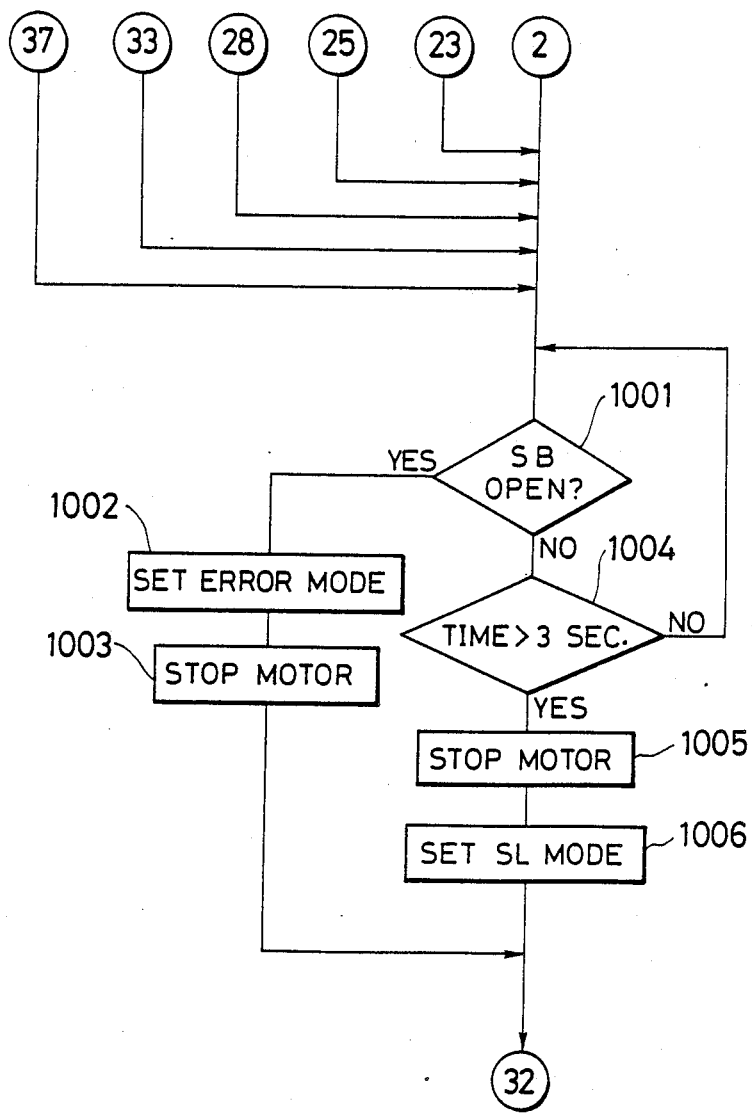
FIG. 10 is a flow chart illustrating a film rewinding routine for a microcomputer of the control system shown in FIG. 1.

If the answer to the question in step 707 is no, a step 708 is taken to make a decision whether the rewinding switch (SR) 21 is on. Although the same step 701 is taken in spite of the condition of the rewind switch (SR) 21 read in step 427 of the flash charging routine shown in FIG. 4, different steps are taken according to the answers to the question as to the rewind switch (SR) 21 in step 708. That is, if the answer in step 708 is yes, a step 1001 of the film rewinding routine shown in FIG. 10 is taken; but otherwise, a step 801 of a first frame setting routine shown in FIG. 8 is taken.

Figure 8:
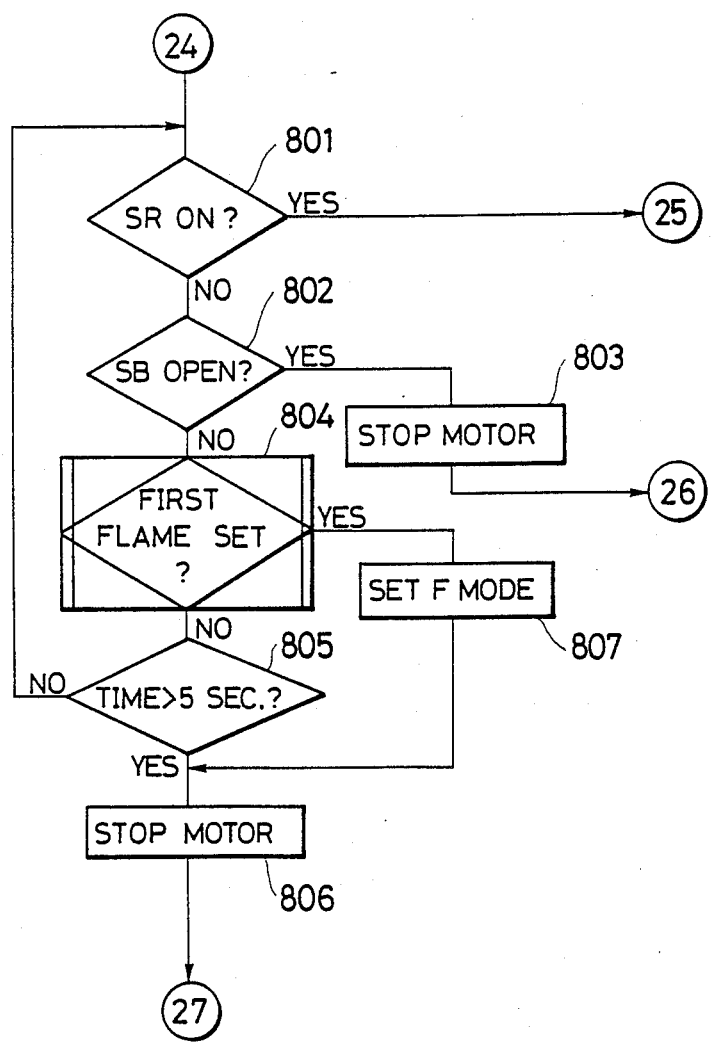
FIG. 8 is a flow chart illustrating a first film frame setting routine for a microcomputer of the control system shown in FIG. 1.

Referring to FIG. 8, there is shown a flow chart illustrating the first frame setting routine in which a leader portion of the film initially loaded is wound so as to place the first frame in an exposure aperture of the camera. When the routine goes to the first step 801 of the first frame setting routine, the motor 30 is driven continuously from the step 706.

The first step 801 is to make a decision whether the rewind switch (SR) 21 is on. If the answer to the decision is yes, indicating the intention of rewinding the film, then the routine goes to step 1001 of the film rewinding routine shown in FIG. 10 without following the remaining steps of the first frame setting routine. If the answer to the question is no, a step 802 is taken to read the condition of the back door switch (SR) 24 so as to decide whether the back door is open. If the answer to the decision is yes, indicating that the first frame setting of the film is not necessary, the motor 30 is stopped in a step 803 and then the routine goes back to step 301 for making the camera ready for exposure.

If the answer to the question in step 802 is no, indicating that the back door is closed, the motor 30 is continuously driven so as to place the first frame of the film in the exposure aperture. To detect that the first frame is in the exposure aperture, perforations of the film are counted in a step 804. For example, one pulse signal $S_o$ is provided every time one frame is wound. Upon placing the first frame in the exposure aperture by winding the leader portion of the film, four pulse signals $S_o$ should be counted. If the answer to the question in step 804 is no, a decision is made in a step 805: "has a five-second time period elapsed?" These steps 801 to 805 are repeated until the answer to the question as to the lapse of the five-second time period becomes yes. If, after the lapse of the five-second time period, the first frame setting is not complete or the answer to the question in step 805 is yes, this indicates that no film is loaded. Thereupon, the motor 30 is stopped in a step 806.

If the answer to the question in step 804 indicates that the first frame setting is completed, the F mode is set and stored in a step 807. The F mode, wherein the camera to is allowed to make exposures, is set when an exposure is made in a step 620 (FIG. 6), when a one frame film advance is made in a step 707 (FIG. 7), etc. When the F mode is set, the motor 30 is stopped in step 806 and then the routine goes back to step 301 for making the camera ready for exposure.

Figure 9:
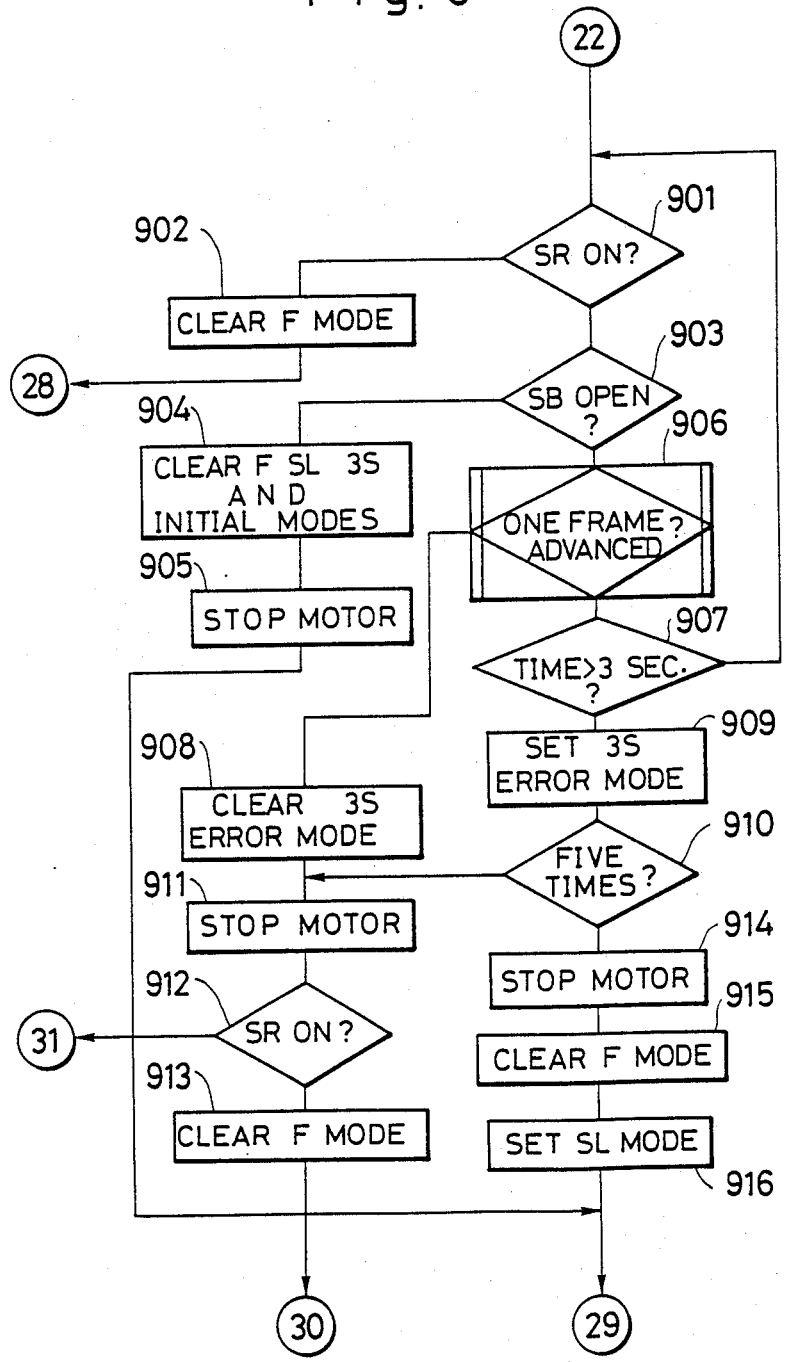
FIG. 9 is a flow chart illustrating a one-film frame advancing routine for a microcomputer of the control system shown in FIG. 1.

Referring to FIG. 9, there is shown a flow chart illustrating the one-frame advancing routine which is carried out when the F mode is set in the camera or the answer to the question in step 707 is yes. It is to be noted that the motor 30 continuously rotates when the first step 901 of the one-frame film advancing routine is carried out.

The first step 901 of the one-frame film advance is to make a decision whether the rewind switch (SR) 21 is on. If the answer to this question is yes, this indicates that all of the exposures have been made and the film has been wound up. Then, after clearing the F mode in a step 902, step 1001 of the film rewinding routine is carried out. On the other hand, if the answer to the question in step 901 is no, then another decision is made in a step 903 as to whether the back door is open. If the answer to this question is yes, then, after clearing the F mode, the SL mode, the 3S error mode and the initial mode in a step 904 and stopping the motor 30 in a step 905, the routine goes back to step 301 of the film rewinding routine.

If the answer to the question in step 903 is no, a decision is made in a step 906 as to whether a one-frame film advance has been completed. As was previously described, the one-frame film advance is confirmed by detecting a pulse signal $S_o$. If the answer to this question is no, indicating an incomplete one-frame film advance, a decision is made in a step 907 as to whether a three-second time period has elapsed. If the three-second time period has not elapsed, steps 901 to 907 are repeated until the answer becomes yes. If a yes answer to the question in step 906 is given, steps 908 and 911 are carried out to clear the 3S mode and to stop the motor 30, respectively.

If the answer to the question in step 907 is yes, this indicates that a one-frame film advance is not complete upon the lapse of the three-second time period after the initiation thereof and that trouble has possibly occurred. Then the 3S error mode is set in a step 909. In a step 910, a decision is made as to how many times the setting of the 3S error mode has been carried out. If the setting of the 3S error mode has been carried out fewer than five times, after stopping the motor 30 in step 911 as well as when the 3S error mode is set, a decision is made in a step 912 as to whether the rewind switch (SR) 21 is on. If the answer to this question is yes, this indicates that the rewind switch (SR) 21 is turned on as a result of tension caused by the film being fully wound up. Then, after clearing the F mode, the routine goes back to step 701 to carry out the operation mode selection routine. On the other hand, if the answer to the question in step 912 is no, then, after winding up the film by one frame, the routine goes back to step 401 to charge the main capacitor of the electronic flash unit so as to make the camera ready for exposure.

If the setting of the 3S error mode is counted five times in step 910, then, after stopping the motor 30 in a step 914, the F mode is cleared in a step 915 so as not to perform another one-frame film advance and the SL mode is set in a step 916 so as to prevent the shutter release button RB from being depressed. Thereafter, the routine goes back to step 301 (FIG. 3) to make the camera ready for exposure.

Referring to FIG. 10, there is shown a flow chart illustrating the film rewinding routine which is carried out when an old battery is replaced with a new battery while the film is still in the camera in step 211, when the rewind switch (SR) 21 is turned on at the completion of winding up of all the frames of the film in step 708, 801 or 902. It is to be noted that the motor 30 continuously rotates when the firs step 1001 of the film rewinding routine is carried out.

The first step 1001 in the film rewinding routine is to read the condition of the back door switch (SB) 24 to decide whether the back door is open or closed. If the answer to this question is yes, this indicates that the back door has been accidentally opened while the motor 30 was in rotation so as to rewind the film. Then, after setting the error mode in a step 1002 and stopping the motor 30 in a step 1003, the routine goes back to step 301. Otherwise, if the decision is no, a decision is made in a step 1004 as to whether three seconds have elapsed with no pulse signal $S_o$. If the decision is no, indicating that a pulse signal has in fact been provided in three seconds, the firs step 1001 is repeated. This means that, as long as a pulse signal $S_o$ is provided within a three-second time period, the rewinding of film is not complete. If the decision in step 1004 is yes, this indicates that no pulse signal $S_o$ has been provided in the three-second time period and the film is fully rewound. Then, after stopping the motor 30 in a step 1005 and setting the SL mode so as to disable the operation of the shutter release button RB in a step 1006, the routine goes back to step 301.

Figure 11:
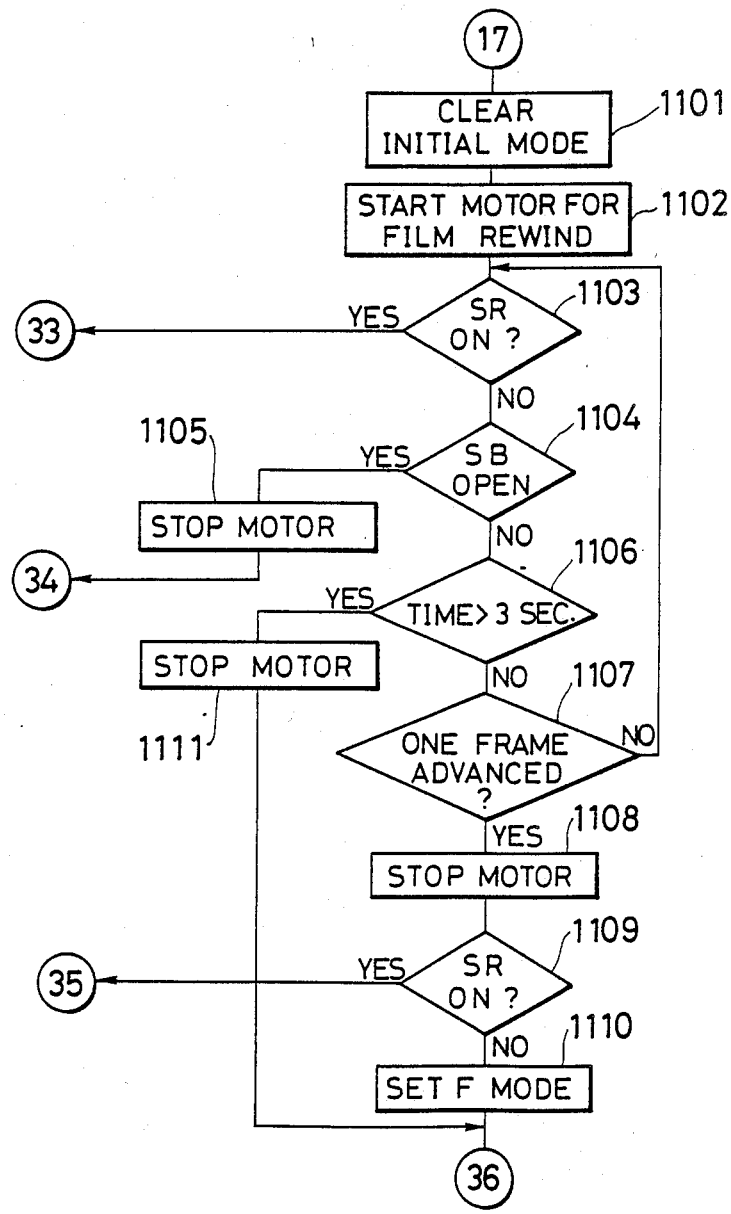
FIG. 11 is a flow chart illustrating a battery replacing routine for a microcomputer of the control system shown in FIG. 1.

Referring to FIG. 11, there is shown the battery replacing routine when the camera is in the initial mode. The battery replacing routine is carried out when the decision in step 619 of the shutter operating routine is yes. That is, when the shutter is released after replacing the battery 25 with another one while a film is in the camera, the battery replacing routine is carried out. The first step 1101 is to clear the initial mode set in step 109 so as to prevent the execution of the battery replacing routine when a shutter release is carried out. After stopping the motor 30 in a step 1102, a decision is made in a step 1103 as to whether the rewind switch (SR) 21 is on. If this decision is yes, the steps beginning with step 1001 are carried out to rewind the film. If the decision is no, the condition of the back door switch (SB) 24 is read in a step 1104 to decide whether the back door is open. If the back door is open, then after stopping the motor 30 in a step 1105, the routine goes back to step 301 to make the camera ready for exposure. On the other hand, if the back door is closed, a step 1106 is carried out to decide whether three seconds has elapsed without a pulse signal $S_o$ having been given. If the decision is no, this indicates that a pulse signal $S_o$ was in fact provided within three seconds and a film is loaded in the camera. Then, the film is advanced by one frame and a decision is made as to whether the one-frame film advance is complete, in a step 1107. If the answer to the decision is no, the decisions in the steps 1103, 1104, 1106 and 1107 are repeated until the one-frame film advance is complete.

If the decision in step 1107 is yes, indicating the completion of a one-frame film advance, then, after stopping the motor 30 in a step 1108, a decision is made in a step 1109: "is the rewind switch (SR) 21 on?" If the decision is yes, indicating that the rewind switch (SR) 21 is on, the routine goes back to step 701 of the operation mode selection routine shown in FIG. 7. On the other hand, if the rewind switch (SR) 21 is off, then, after replacing the battery 25 with another one and advancing the film by one frame, the F mode is set in a step 1110. Thereafter, the routine goes back to step 401 to charge the main capacitor of the electronic flash unit.

If the decision in step 1106 is yes, this indicates that the film advance did not take place within three seconds. This means possibly that no film is loaded in the camera or that there is some trouble with the camera. Therefore, after stopping the motor 30 in a step 1111, the routine goes back to step 301 (FIG. 3) to make the camera ready for exposure.

Figure 12:
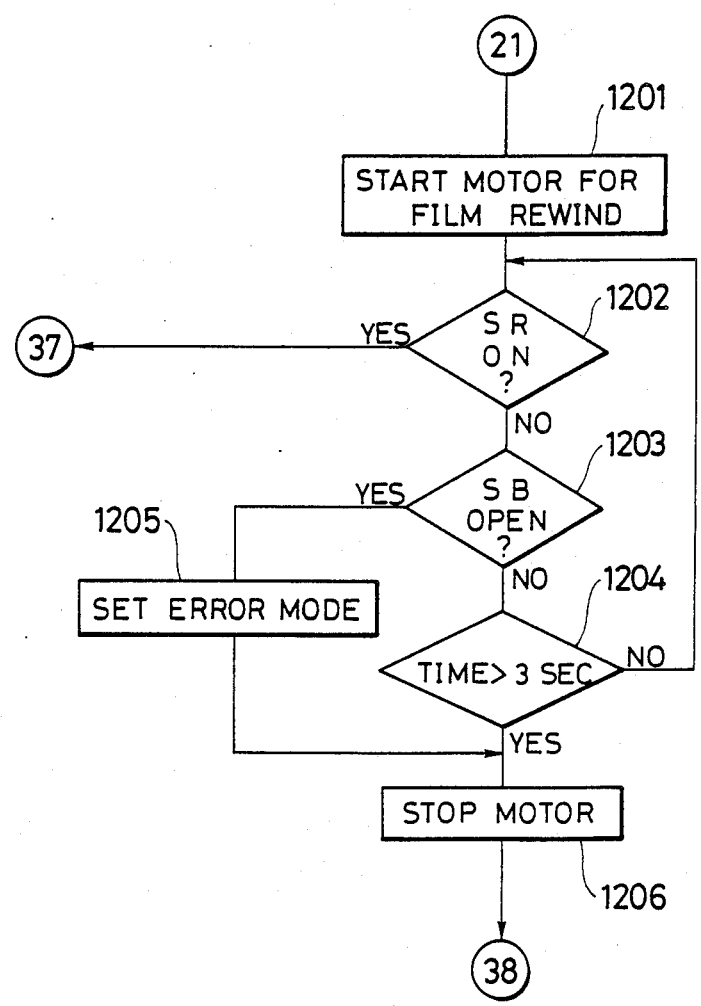
FIG. 12 is a flow chart illustrating an error management routine for a microcomputer of the control system shown in FIG. 1.

Referring to FIG. 12, there is shown a flow chart illustrating the error management routine which is carried out when the back door is accidentally opened and the error mode is set in step 1002 as a result of an accidental opening of the back door. It is to be noted that the rewind switch (SR) 21 is automatically turned off in cooperation with the opening of the back door.

The first step 1201 is to drive the motor 30 for film winding, because prior to step 1201 the motor 30 is stopped. A decision is made in a step 1202 whether the rewind switch (SR) 21 is on. If the decision is yes, the routine goes back to step 1001 of the battery replacing routine for film rewinding. On the other hand, if the decision is no, indicating that the rewind switch (SR) 21 is off, another decision is made in a step 1203: "is the back door switch (SB) 24 open?" If the back door is accidentally opened, it will normally be closed immediately, and so the answer to the decision in the step 1203 is ordinarily no. Then, a step 1204 is carried out to decide whether a three-second time period has elapsed. The decision as to the lapse of the three-second time period is made by detecting a pulse signal $S_o$ provided one per frame. If the decision is no, this indicates that a pulse signal $S_o$ was provided before the lapse of the three-second time period. Then steps 1202 to 1204 are repeated. When the film is fully wound up and is tensioned, the rewind switch (SR) 21 is turned on, so that the decision in step 1202 becomes yes, and the routine goes back to step 1001 of the film rewinding routine. That is, if the back door is accidentally opened while the film is rewound, the film rewinding is started again after it is fully wound up.

If the decision in step 1203 is yes, indicating that the back door is open, then, after setting the error mode in a step 1205, a step 1206 is taken to stop the motor 30. If the decision in step 1204 is yes, indicating that no pulse signal $S_o$ was provided before the lapse of the three-second time period, then step 1206 is taken to stop the motor 30. After step 1206, the routine goes back to step 701 of the operation mode selection routine.

Referring to FIG. 13, there is shown a flow chart illustrating the gear train changing routine. When the film is fully rewound, the SL mode is set in step 1006 and the back door is opened to take out the film, the answers to the questions in steps 310 and 311 are yes. Then, the routine goes to the first step 1301 to decide whether the rewind switch (SR) 21 is on. If the decision is yes, a step 1302 is carried out to read the condition of the back door switch (SB) 24 so as to decide whether the back door is open. If the decision in step 1302 is no, the routine goes back to step 301 to make the camera ready for exposure. If the decision in step 1302 is yes, steps 1301 and 1302 are repeated until the rewind switch (SR) 21 is turned off or the back door is closed.

If the first decision in step 1301 is no, indicating that the rewind switch (SR) 21 is off, then after starting the motor 30 in a step 1303 and continuously driving it for a short time period, for example about 300 m-seconds, for zooming in a step 1304, the motor 30 is stopped in a step 1305. The short time period of rotation of the motor 30 is effected to avoid any play in the reversible gear train due to backlash on the gear train caused when changing the direction of rotation in which the motor output is transmitted through the gear train. Finally, after clearing the F mode, SL mode and the 3S error mode, the routine goes back to step 401 to charge the main capacitor of the electronic flash unit.

Figure 14:
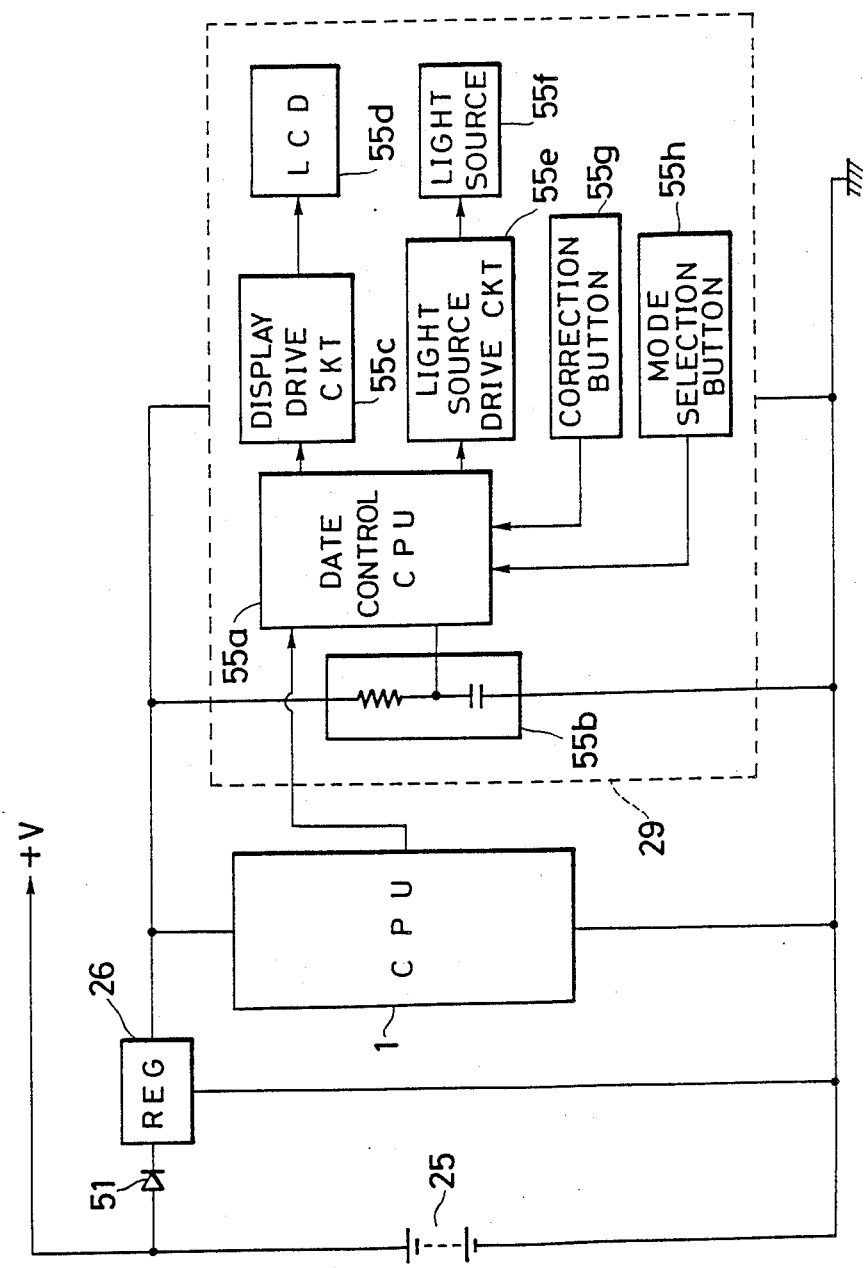
FIG. 14 is a block diagram showing a date control unit shown in FIG. 1.

Referring now to FIG. 14, the date recording unit 29 is shown in detail. The date recording unit 29 is connected to the battery 25 through the regulator 26 and a diode 51 and is in parallel with the camera control CPU 1. The date recording unit 29 has a date control unit CPU 55a for controlling the operations of the various circuits, such as a display drive circuit 55c and a light source drive circuit 55e. A trigger circuit 55b provides the date control unit CPU 55a with a trigger signal so as to reset the date control unit CPU 55a when the battery 25 is loaded. The display drive circuit 55c causes a liquid crystal display device 55d to display a date which is to be recorded on the film. The light source drive circuit 55e energizes a light source 55f to project the date onto the film. A date correction button 55g is provided in connection with the date control unit CPU 55a and is manually operated to change date or time to be displayed on the liquid crystal device. A mode selection button 55h is provided in connection with the date control unit. CPU 55a and is manually operated to change the date recording mode of the date recording unit 29 to a date display mode or a time display mode or an off mode. The date control unit CPU 55a has a clock program so as to display data including date and time on the liquid crystal display device 55d. The date control unit CPU 55a has, in addition to a function of actuating the light source drive circuit in response to a date recording signal from the camera control CPU 1 so as to record the displayed date and/or time on the film, also a function of controlling the display of the liquid crystal display device 55e and the initial setting of the date recording mode according to a sequential routine of operations shown in FIG. 15. The date control unit CPU 55a is an ephemeral storage device and has no back-up function.

Figure 15:
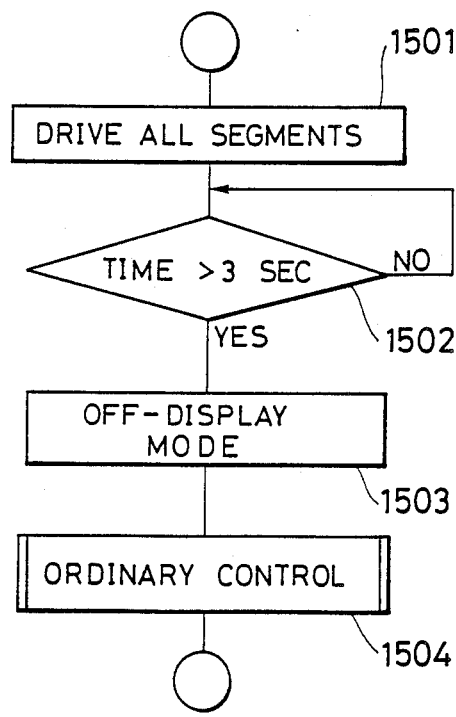
FIG. 15 is a flow chart illustrating a date recording control routine for a microcomputer of the date control unit shown in FIG. 14.

Referring to FIG. 15, there is shown a flow chart illustrating a date control unit routine that is carried out when the battery 25 is replaced.

When a new battery is loaded in place of the battery 25, the trigger circuit 55b provides a reset signal to reset the date control unit CPU 55a. Upon resetting the date control unit CPU 55a, all of the segments constituting the liquid crystal display device 55d are driven to emit light in a step 1501 and this drive is maintained for three seconds in a step 1502. This results in an instantaneous checking of the segments without operating the date correction button 55g. After this checking of the segments, the date control unit CPU 55a is actuated to set the off mode wherein no date is recorded on the film, in a step 1503. Thereafter, an ordinary control is carried out in a step 1504 to allow date correction by means of the date correction button 55g and display mode selection by means of the display mode selection button 55h. As will be apparent from the above, upon replacing the battery 25, no date and hence no wrong date is recorded, even when the resetting of the correct date is forgotten.

Although the present invention has been fully described by way of a preferred embodiment thereof with reference to the accompanying drawings, it is to be noted that various changes and modifications will be apparent to those skilled in the art. Therefore, unless otherwise these changes and modifications depart from the scope of the present invention, they should be construed as included therein.

What is claimed is:

1. A photographic camera having a zoom lens as a taking lens which is moved back and forth by means of an electric motor so as to change the focal length of said zoom lens and a lens barrier which covers and protects said zoom lens when said camera is not used, said camera comprising:
    a switch adapted to open and close upon opening and closing said barrier; and
    means for reading conditions of said switch upon loading a battery into said camera so as to actuate said electric motor in order to retract said zoom lens inside a housing of said camera upon reading a condition of said switch indicating that said lens barrier is closed or to extend said zoom lens to a photographic position upon reading a condition of said switch indicating that said lens barrier is open.

2. A photographic camera as defined in claim 1, further comprising an encoder for providing said means with a signal indicating said photographic position.

* * * * *